United States Patent [19]

Gaddi

[11] 4,132,281
[45] Jan. 2, 1979

[54] DRIVE WHEEL WITH AN INTERNAL COMBUSTION ENGINE HOUSED IN ITS INTERIOR

[75] Inventor: Bruno Gaddi, Pisa, Italy

[73] Assignee: Piaggio & C. S.p.A., Genoa, Italy

[21] Appl. No.: 771,319

[22] Filed: Feb. 23, 1977

[30] Foreign Application Priority Data

Jun. 25, 1976 [IT] Italy ................................ 24781 A/76

[51] Int. Cl.² ............................................. B62D 3/00
[52] U.S. Cl. ................................. 180/33 C; 180/33 E
[58] Field of Search ................ 180/33 E, 33 C, 33 R, 180/65 F

[56] References Cited

U.S. PATENT DOCUMENTS

| | | | |
|---|---|---|---|
| 684,787 | 10/1901 | Buckley | 180/33 E |
| 2,575,873 | 11/1951 | Henney | 180/33 E |
| 2,586,702 | 2/1952 | Obram | 180/33 E |
| 2,588,889 | 3/1952 | Sherwood | 180/33 E |

FOREIGN PATENT DOCUMENTS 822211 11/1951 Fed. Rep. of Germany.
2454433 5/1976 Fed. Rep. of Germany ........ 180/33 C

*Primary Examiner*—Joseph F. Peters, Jr.
*Assistant Examiner*—Michael Mar
*Attorney, Agent, or Firm*—Cushman, Darby & Cushman

[57] ABSTRACT

This invention relates to a drive wheel for motor vehicles, in particular motorcycles, having an internal combustion engine arranged in the wheel interior. According to the invention, the wheel rotates about a pivot fixed to the engine block and receives its motion, through a suitable transmission, from a drive shaft emerging from that side of the engine block opposite the side to which the wheel support pivot is fitted. This arrangement of the wheel and the drive shaft enables the internal space of the wheel to be utilized to the maximum extent for arranging the engine-transmission assembly in suitable manner.

6 Claims, 2 Drawing Figures

DRIVE WHEEL WITH AN INTERNAL COMBUSTION ENGINE HOUSED IN ITS INTERIOR

The present invention relates to a drive wheel with an internal combustion engine suitable for propelling terrestrial vehicles, in particular motorcycles, characterised by a particular combination of constructional elements the main purpose of which is to simplify the drive unit and, more generally, the entire structure of the vehicle, mainly for constructional economy and lightness.

More precisely, according to the invention, this object is attained by a drive wheel for motor vehicles, in particular motorcycles, of the type comprising an internal combustion engine arranged in the wheel interior, wherein said drive wheel rotates about a pivot fixed to the engine block and receives its motion, via a suitable transmission, from the drive shaft emerging from that side of the engine block opposite the side to which the wheel support pivot is fitted.

The invention is represented diagrammatically in the figures of the accompanying drawing, showing its application to a motorcycle with a single-cylinder explosion engine.

Figure 2:
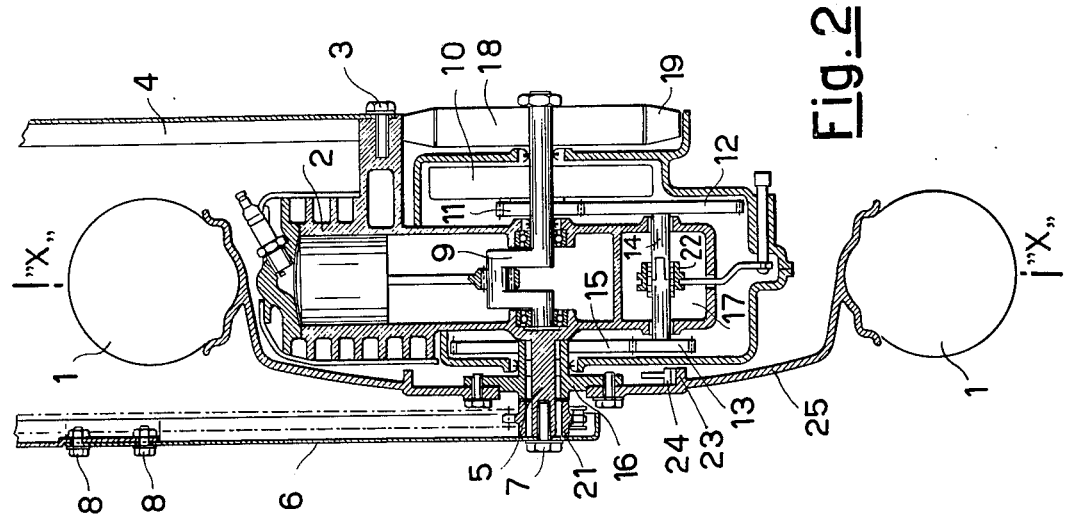
Figure 1:
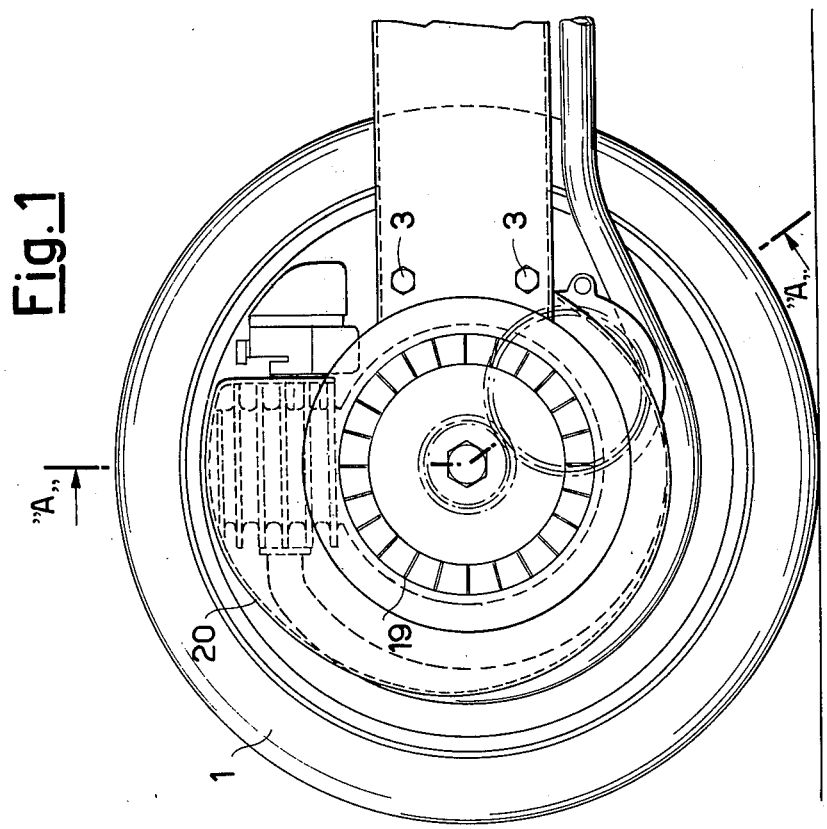

FIG. 1 is a side view of the invention;
FIG. 2 is a cross-section through the invention on the plane A—A of FIG. 1.

The engine 2 is contained in the interior of the wheel 1, by giving a suitable shape to the wheel disc 25.

The engine block is connected rigidly on one side by screws 3 to the vehicle frame 4, and on the other side it carries the axle or pivot 5 on which the wheel 1 is rotatable. The pivot 5 is also connected to the frame. The connection is made with the screw 7 and screws 8 via the arm 6, which can be dismantled, or any other equivalent connection so as to enable the wheel 1 to be easily removed without it being necessary to remove the entire engine-transmission assembly from the frame. The arm 6 contributes in a determined manner to the rigidity and lightness of the frame. However it is evident that the engine may also be supported only on the side of the connections 3.

The drive shaft 9 emerges from that side of the engine block opposite from that which the pivot 5 projects, and drives the wheel 1 through a suitable transmission, which in the example shown in the figure consists of the friction clutch 10, the pinion 11, the gear wheels 12 and 13 situated on the intermediate shaft 14, and the gear 15 rigid with the hub 16 of the wheel 1. The friction clutch 10 may be of the automatic centrifugal type, with masses operated by the wheel 1 for starting the engine if pedals exist, and masses operated by the engine for normal automatic engagement.

The transmission between the drive shaft 9 and wheel 1 could also comprise a gearbox arranged in the space 17, and the clutch could be of the controlled type rather than automatic.

The aforesaid relative arrangement of the shaft and wheel enables the internal space of the wheel to be utilised to the maximum extent for arranging the engine-transmission assembly such that the cylinder axis lies in the centre plane of the wheel x—x and the axis of the drive shaft 9 coincides with that of the vehicle wheel 1.

The flywheel magneto 18 and engine cooling fan 19 are also mounted on the drive shaft 9. The cooling air is conveyed to the cylinder and engine head through the volute 20.

A free-wheel sprocket 21 is keyed on the wheel hub 16, to be chain driven by the possible pedals of the vehicle, and to serve also for starting the engine.

The transmission is provided with a suitable decoupling mechanism 22 to enable the wheel to be driven by the pedals without dragging the motor when this is not operating.

The wheel is completed by the brake device shown in the figure by the drum 23 and shoe 24.

The figures of the accompanying drawing constitute only one diagrammatic embodiment, given by way of example, of the relative arrangement of the basic constructional elements claimed. In particular, the invention may be applied to a motor vehicle without pedals, and to a multi-cylinder engine.

The axis of the cylinder, which in the figure is disposed vertically with its head at the top for obvious advantages of cleaning and ease of replacement of the sparking plug, could also be positioned differently. The cylinder axis lies on the center plane of the wheel and the axis of the drive shaft coincides with the wheel axis for reasons of constructional rationality, but they could be disposed only parallel.

What we claim is:

1. A drive wheel and mounting structure assembly for a motorcycle having a main frame and first and second horizontally spaced apart vertically extending sections, said assembly comprising a wheel having a hub connected to a pedal-driven transmission provided with a free-wheel mechanism, an internal combustion engine arranged inside the wheel, the engine including an engine housing and a drive shaft coaxial with the wheel emerging from one side of the engine housing, said engine housing having said side releasably attached to said first vertically extending section of a vehicle frame, the opposite side of said engine housing being provided with a projecting pivot on which the wheel is rotatably supported, said pivot being releasably attached to said second vertically extending section of the vechicle frame said second section of the vehicle frame being attached to the main frame to allow easy removal of the wheel when desired, and a transmission drivingly connecting the drive shaft with the wheel.

2. A drive wheel assembly as in claim 1 wherein the transmission includes a train of cylindrical gears having axes parallel to those of the engine and wheel.

3. A drive wheel assembly as in claim 1 wherein the transmission includes a gearbox.

4. A drive wheel assembly as in claim 1 wherein the transmission is of constant transmission ratio, and includes a friction clutch of the centrifugal type connected both to the drive shaft and to the wheel, and is situated on the drive shaft at the location of a primary transmission pinion.

5. A drive wheel assembly as in claim 1 wherein the axis of the engine cylinder or cylinders is situated approximately in the centre plane of the wheel.

6. A drive wheel assembly as in claim 1 wherein the transmission between the engine and wheel includes a decoupling mechanism.

* * * * *